United States Patent [19]

Nelson et al.

[11] Patent Number: 4,522,553

[45] Date of Patent: Jun. 11, 1985

[54] COMBINE POWER BOOST SYSTEM

[75] Inventors: Leon F. Nelson, Cedar Falls; Dan T. Montgomery, Waterloo, both of Iowa; Michael K. Wyffels, Geneseo, Ill.; William J. Sikula, Jr., Waterloo, Iowa

[73] Assignee: Deere & Company, Moline, Ill.

[21] Appl. No.: 417,236

[22] Filed: Sep. 13, 1982

[51] Int. Cl.³ .................................................. B60P 1/42
[52] U.S. Cl. .................................. 414/526; 192/0.096; 56/DIG. 15
[58] Field of Search .......................... 192/0.084, 0.096; 56/DIG. 15, 10.2, 10.3; 414/526

[56] References Cited

U.S. PATENT DOCUMENTS

| | | | |
|---|---|---|---|
| 3,129,795 | 4/1964 | Goeschel et al. | 192/0.084 X |
| 3,253,774 | 5/1966 | Dietrich | 192/0.084 X |
| 3,606,742 | 9/1971 | Wieneke et al. | 56/DIG. 15 |
| 4,130,980 | 12/1978 | Fardal | 56/DIG. 15 |

*Primary Examiner*—George H. Krizmanich

[57] ABSTRACT

A combine auger drive is operated by closing a switch which energizes a solenoid-operated valve which engages a hydraulic auger drive clutch. An electronic controller controls combine engine fuel delivery rate in response to sensed engine speed on throttle position via an electrically-operated, rack-controlled fuel pump. A summing unit modifies the rack position control signal when the switch is closed to increase fuel pumping rate when the auger drive is engaged.

6 Claims, 1 Drawing Figure

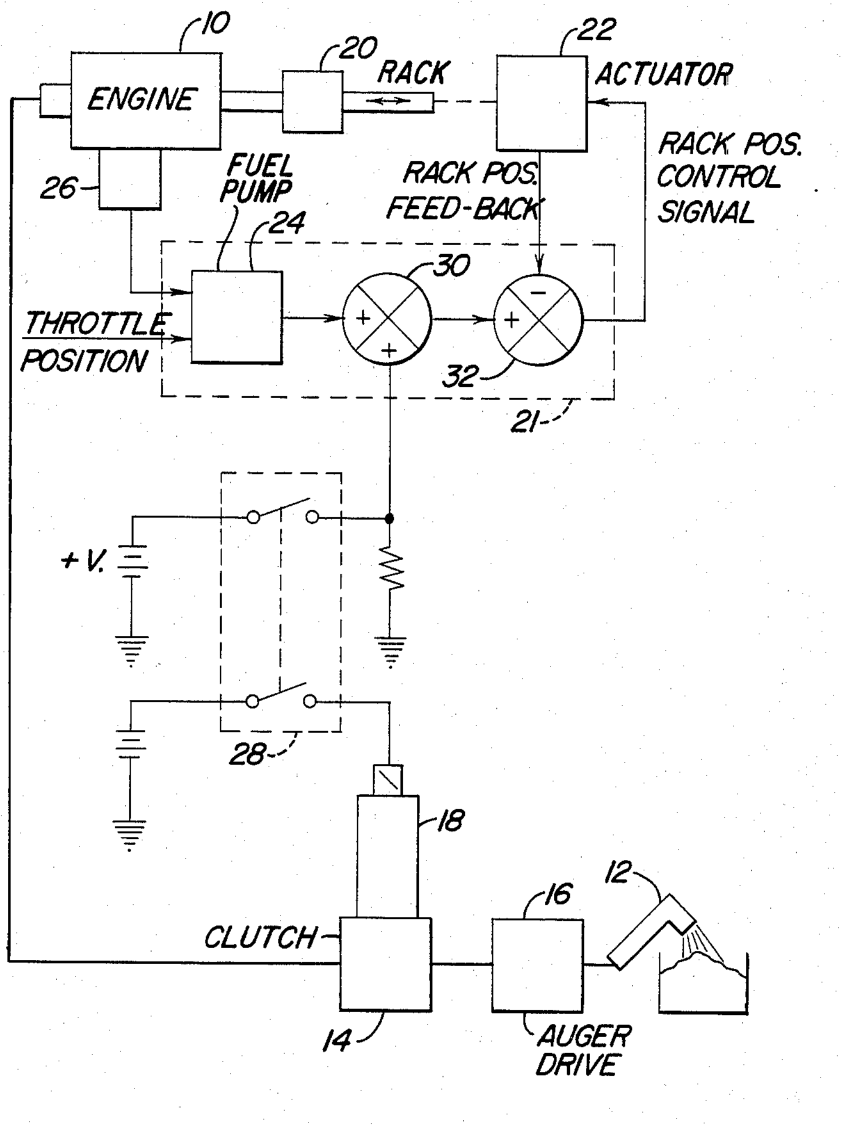
10
ENGINE
20
RACK
22
ACTUATOR
26
FUEL
PUMP
24
RACK POS.
FEED-BACK
RACK POS.
CONTROL
SIGNAL
30
THROTTLE
POSITION
32
21
+V.
28
18
12
16
CLUTCH
14
AUGER
DRIVE

COMBINE POWER BOOST SYSTEM

BACKGROUND OF THE INVENTION

This invention relates to a control system for controlling the power produced by a vehicle engine.

Agricultural vehicles, such as combines, have engine-driven auxiliary functions, such as unloading augers, which may be operated while the vehicle is in motion. In the case of a moving combine unloading grain into a wagon, truck or other grain handling vehicle, it is important for the combine and wagon travel speeds to remain constant to prevent crop spillage caused by relative movement therebetween. However, under certain crop conditions, such as dry corn, present combines are power-limited and engagement of the auger drive clutch may lug down the engine and reduces combine travel speed, thus making it difficult to maintain a constant spacing between the combine and the crop-receiving wagon.

SUMMARY OF THE INVENTION

It is an object of the present invention to provide an engine control system for a combine which increases the power output of the engine when the auger drive is engaged.

This and other objects are achieved by the present invention wherein a combine engine receives fuel from a rack-controlled fuel injection pump. Rack position is controlled by an electromagnetic actuator in response to control signals received by it. An electronic control unit generates a first signal in response to sensed engine speed and throttle position. A switch is closed to energize a solenoid-operated valve which engages a hydraulic auger drive clutch. Switch closure also produces a second signal which, along with the first signal, is added together by a summing unit. A difference unit subtracts a rack position feedback signal from the summed signal and the result is applied to the electromagnetic actuator.

BRIEF DESCRIPTION OF THE DRAWING

The FIGURE is a circuit block diagram of the present invention.

DETAILED DESCRIPTION

An agricultural combine (not shown) includes a conventional diesel engine 10 which powers drive wheels (not shown) via a transmission (not shown) and powers auxiliary equipment, such as an unloading auger 12, via a conventional hydraulically-operated clutch 14 and an auger drive unit 16. The clutch 14 is engaged and disengaged by a solenoid-operated control valve 18.

The engine 10 is supplied with fuel at controlled fuel delivery rates by a conventional rack-controlled fuel pump 20. The fuel pump rack position is controlled by a solenoid actuator 22 which includes a rack position feedback signal. Fuel pump 20 and actuator 22 are available in combined units, including units such as the DYNA-I Precision Governor produced by the Barber-Coleman Company.

A control circuit 21 includes a known electronic control unit 24 which produces an output control signal as a function of engine speed signal from a conventional engine speed sensor 26 and as a function of a throttle position signal which may be produced, for example, by a potentiometer (not shown).

A switch 28 simultaneously applies signals to the solenoid-operated auger control valve 18 and to an input of a summing unit 30. Summing unit 30 generates an output signal as a sum of the signals from switch 28 and from control unit 24. A subtracting unit 32 generates a rack position control signal which is a difference between the output of summing unit 30 and the rack position feedback signal from actuator 22.

When the auger 12 is not actuated, then the control circuit 21 operates in a conventional manner to regulate the speed of the engine 10. In this mode, the engine 10 will be limited to produce no more than a desired maximum amount of power, depending upon the engine speed. However, when switch 28 is closed to operate the auger 12, the magnitude of the rack position control signal is immediately increased so that fuel is delivered to the engine 10 at a faster rate to increase its power output. This prevents reduction of the combine travel speed when the auger 12 is operated while the combine is traveling.

While the invention has been described in conjunction with a specific embodiment, it is to be understood that many alternatives, modifications, and variations will be apparent to those skilled in the art in light of the aforegoing description. Accordingly, this invention is intended to embrace all such alternatives, modifications and variations which fall within the spirit and scope of the appended claims. For example, it would be within the scope of this invention to implement the same function in a system wherein the fuel pump rack position is controlled via a microprocessor-based electronic control unit.

I claim:

1. In an engine-driven combine having an unloading auger powered by the engine and capable of being operated while the combine is traveling, an engine power control system comprising:

switch means manually operable to activate and deactivate the unloading auger; and control means coupled to the switch means for momentarily increasing power produced by the engine to prevent reduction of combine travel speed in response to activation of the unloading auger by operation of the switch means.

2. The invention of claim 1, further comprising:

a hydraulically-operated clutch engageable and disengageable to control transmission of power from the engine to the auger; and electrically-operated valve means coupled to the switch means for engaging and disengaging the clutch in response to operation of the switch means.

3. The invention of claim 1, wherein the control means comprises:

a rack-controlled fuel pump for delivering fuel to the engine at varying rates determined by rack position;

rack translating means for controlling rack position in response to control signals received thereby;

a control unit for generating a first signal as a function of engine speed and throttle position, the switch means generating a second signal when the unloading auger is activated; and summing means for generating the control signal as a function of the sum of the first and second signals.

4. In an engine-driven vehicle having an auxiliary function powered by the engine and capable of being operated while the vehicle is traveling, an engine power control system comprising:

a fuel injection pump having adjustable means for controlling the rate of fuel delivered by the pump to the engine;

actuator means for controlling the adustable means in response to a control signal applied to an input of the actuator means;

a switch means manually operable for activating and deactivating the auxiliary function; and electrical means for generating the control signal as a function of sensed vehicle and operator-controlled parameters, the electrical means including means for modifying the control signal in response to operation of the switch means so that the actuating means moves the adjustable means to increase the rate of fuel delivered by the fuel injection pump and thereby increasing the power output of the engine to prevent reduction of vehicle travel speed during operation of the auxiliary function.

5. In a combine having a diesel engine and an unloading auger powered by the engine and capable of being operated while the combine is traveling, an engine power control system comprising:

a fuel injection pump having adjustable means for controlling the rate of fuel delivered by the pump to the engine;

actuator means for controlling the adjustable means in response to a control signal applied to an input of the actuator means;

a switch manually operable to activate and de-activate the unloading auger; and electrical means for generating the control signal as a function of sensed engine speed and an operatordetermined throttle setting, the electrical means including means for modifying the control signal in response to operation of the switch so that the actuating means moves the adjustable means to increase the rate of fuel delivered by the pump and increase the power output of the engine to prevent reduction of combine travel speed during operation of the auxiliary function.

6. In an engine-driven combine having an unloading auger powered by the engine and capable of being operated while the combine is traveling, an engine power control system comprising:

manually-operable switch means for generating a first signal when closed;

a hydraulically-operated clutch engageable and disengageable to control transmission of power from the engine to the auger;

electrically-operated valve means coupled to the switch means for engaging and disengaging the clutch in response to operation of the switch means;

a rack-controlled fuel pump for delivering fuel to the engine at varying rates determined by rack position;

rack translating means for controlling rack position in response to control signals received thereby;

a control unit for generating a second signal as a function of engine speed and throttle position; and summing means for generating the control signal as a function of the sum of the first and second signals.

* * * * *

UNITED STATES PATENT AND TRADEMARK OFFICE
CERTIFICATE OF CORRECTION

PATENT NO. : 4,522,553

DATED : 11 June 1985

INVENTOR(S) : Leon Franklin Nelson et al

It is certified that error appears in the above-identified patent and that said Letters Patent is hereby corrected as shown below:

In Col. 1, line 2, delete "COMBINE POWER BOOST SYSTEM" and insert -- COMBINE WITH AN AUGER CLUTCH RESPONSIVE ENGINE CONTROL --.

Signed and Sealed this

*Eighteenth* Day of *February 1986*

[SEAL]

*Attest:*

DONALD J. QUIGG

*Attesting Officer* *Commissioner of Patents and Trademarks*